(12) United States Patent
Morishita (10) Patent No.: US 9,858,501 B2
(45) Date of Patent: Jan. 2, 2018

(54) RELIABILITY ACQUIRING APPARATUS, RELIABILITY ACQUIRING METHOD, AND RELIABILITY ACQUIRING PROGRAM

(71) Applicant: NEC CORPORATION, Tokyo (JP)

(72) Inventor: Yusuke Morishita, Tokyo (JP)

(73) Assignee: NEC CORPORATION, Tokyo (JP)

(*) Notice: Subject to any disclaimer, the term of this patent is extended or adjusted under 35 U.S.C. 154(b) by 64 days.

(21) Appl. No.: 14/379,304

(22) PCT Filed: Feb. 8, 2013

(86) PCT No.: PCT/JP2013/053105
§ 371 (c)(1),
(2) Date: Aug. 18, 2014

(87) PCT Pub. No.: WO2013/122009
PCT Pub. Date: Aug. 22, 2013

(65) Prior Publication Data
US 2015/0023606 A1     Jan. 22, 2015

(30) Foreign Application Priority Data
Feb. 16, 2012   (JP) ................................. 2012-031319

(51) Int. Cl.
*G06K 9/68*     (2006.01)
*G06K 9/62*     (2006.01)
*G06K 9/00*     (2006.01)

(52) U.S. Cl.
CPC ....... *G06K 9/6215* (2013.01); *G06K 9/00255* (2013.01); *G06K 9/00261* (2013.01); *G06K 9/00281* (2013.01); *G06K 9/6267* (2013.01)

(58) Field of Classification Search
CPC ........... G06K 9/00255; G06K 9/00261; G06K 9/00281; G06K 9/6215; G06K 9/6267
(Continued)

(56) References Cited

U.S. PATENT DOCUMENTS

2009/0220157 A1* 9/2009 Kato ................... G06K 9/00281
382/201
2009/0304290 A1* 12/2009 Fukaya ............... G06K 9/00228
382/224
2010/0189358 A1* 7/2010 Kaneda ............... G06K 9/00744
382/195

FOREIGN PATENT DOCUMENTS

JP    2000-339476    12/2000
JP    2005-149506    6/2005
(Continued)

OTHER PUBLICATIONS

International Search Report—PTCT/JP2013/053105—dated Apr. 16, 2013.
(Continued)

*Primary Examiner* — Manuchehr Rahmjoo
(74) *Attorney, Agent, or Firm* — Young & Thompson (57) ABSTRACT

A reliability acquiring apparatus includes a section that stores information on a classifier that outputs part likelihood concerning a predetermined part of a detection target when applied to an image, a section that calculates, concerning an image region included in an input image, the part likelihood on the basis of the information on the classifier, a section that determines, on the basis of the calculated part likelihood, a position of the predetermined part in the input image, a section that stores information on a reference position of the predetermined part, a section that calculates, on the basis of the information on the reference position, difference information between the reference position of the predetermined part and the determined position of the predetermined part, and a section that calculates, on the basis of the difference information, reliability indicating possibility that the input image is an image of the detection target.

11 Claims, 6 Drawing Sheets

(58) Field of Classification Search
USPC .......................................................... 382/219
See application file for complete search history.

(56) References Cited

FOREIGN PATENT DOCUMENTS

| JP | 2009-89077 | 4/2009 |
| JP | 2009-123081 | 6/2009 |
| JP | 2010-191592 | 9/2010 |
| JP | 2011-130203 | 6/2011 |
| WO | WO2011/148596 | 12/2011 |

OTHER PUBLICATIONS

International Search Report—PCT/JP2013/053105—dated Apr. 16, 2013.
D. Cristinacce & T.F. Cootes—"A Comparison of Shape Constrained Facial Feature Detectors", In 6th International Conference on Automatic Face and Gesture Recognition 2004, Korea, pp. 357-380, 2004.
Yamashita et al, "False Detection Reduction for face Detection", The Institute of Electronics, Information and Communication Engineers Technical Research Report PRMU2004-102.

\* cited by examiner

RELIABILITY ACQUIRING APPARATUS, RELIABILITY ACQUIRING METHOD, AND RELIABILITY ACQUIRING PROGRAM

BACKGROUND

The present invention relates to a reliability acquiring apparatus, a reliability acquiring method, and a reliability acquiring program.

A large number of detection techniques for specifying a position of a target (e.g., a face region) in an image have been proposed. In most of such detection techniques, a target is detected when an input image is given, by thoroughly searching through the input image using a classifier that determines whether an image region is the target.

The classifier used in face detection is usually generated by preparing a large quantity of cropped images of face regions and images not including a face and performing learning. However, it is difficult to prepare an image group for the learning completely including information necessary for discriminating whether a face region is a face. Therefore, in general, a built classifier involves a certain degree of detection errors. The detection errors include two kinds of detection errors: a face region cannot be determined as the face and is overlooked (un-detection); and a region that is not the face is determined as the face by mistake (misdetection). Concerning the latter, several techniques for reducing the number of misdetections are known.

For example, Patent Document 1 describes, as the method of reducing misdetections of a face, a method of determining whether a region detected as a face is the face according to whether a color of the region is a skin color.

Patent Document 2 describes, as the method of reducing misdetections of a face, a method of determining whether a face region is a face using a statistical model concerning textures and shapes of faces. In this method, parameters of the statistical model is adjusted and a difference in intensity values between a face image generated from the model and an cropped image of a face region on the basis of a face detection result is minimized. Note that the face image generated from the model and the cropped image of the face region on the basis of the face detection result are respectively normalized concerning a face shape. When the minimized difference in the intensity values is equal to or larger than a predetermined threshold, it is determined that a detection result is a misdetection. Usually, the statistical model concerning the face has poor expression of images other than the face, if the cropped face image on the basis of the face detection result is not the face (misdetection), the difference in the intensity values between the face image generated from the model and the cropped face image on the basis of the face detection result is considered to increase. The method described in Patent Document 2 is a method of determining on the basis of such knowledge whether the face detection result is truly the face according to the difference in the intensity values.

Non-Patent Document 1 proposes, as the method of reducing misdetections of a face, a method of learning a face misdetection determination device using a support vector machine (SVM) and applying the determination device to a region cropped on the basis of a face detection result to more actively eliminate a misdetection. In this method, a classifier is built that learns an image feature value extracted by Gabor wavelet transformation using the SVM and identifies whether a texture of a target region is like a face.

Patent Document 1: Patent Publication JP-A-2009-123081

Patent Document 2: Patent Publication JP-A-2010-191592

Non-Patent Document 1: Yamashita, et al., "False Detection Reduction for Face Detection", The Institute of Electronics, Information and Communication Engineers Technical Research Report PRMU2004-102

Non-Patent Document 2: D. Cristinacce and T. F. Cootes, "A Comparison of Shape Constrained Facial Feature Detectors," In 6th International Conference on Automatic Face and Gesture Recognition 2004, Korea, pages 357-380, 2004

SUMMARY

However, in the method of Patent Document 1, it is determined whether the region detected as the face is the face on the basis of whether the color in the region detected as the face is the skin color. Therefore, there is a problem in that, whereas a background other than the skin color can be eliminated as a region other than the face, when a region having a color close to the skin color is included in the background or when a color of the skin of the face changes because of the influence of illumination fluctuation, it is impossible to appropriately determined whether the region detected as the face is the face.

In the method of Patent Document 2, the difference concerning the intensity image between the detected face region and the statistical model concerning the face is used. In this case, in an environment in which illumination, facial expression, and the like complicatedly change, intensity values in a face region also complicatedly changes. Therefore, it is difficult to fixedly determine at which degree of a difference value between the detected face region and the intensity image of the statistical model a misdetection occurs. Therefore, the method of determining whether the region detected as the face is the face on the basis of the difference value of the intensity image has a problem in that accuracy is not sufficiently obtained.

Further, in the method of Non-Patent Document 1, the image feature value by the Gabor wavelet transformation is extracted from the entire extracted face region and is used for determining whether the face region is the face. However, when a face detector determines a region, which is not a face, such as a background as the face by mistake, in the first place, the misdetection is considered to be caused by a face-like texture included in the region. In this case, there is possibility that the image feature value extracted from the entire detected face region indicates that the target region is like the face. Therefore, in the method of determining whether the region detected as the face is the face according to the image feature value extracted from the entire detected face region as in the method of Non-Patent Document 1, there is a problem in that accuracy is not sufficiently obtained and it is difficult to reduce misdetections of the face.

These problems are problems that also occur when a part other than the face is a detection target.

Therefore, the present invention has been devised to solve the problems and it is an object of the present invention to, in order to reduce detection errors such as misdetections, calculate, at high accuracy, reliability for determining whether an input image is an image of a detection target (e.g., a face image).

A reliability acquiring apparatus according to an aspect of the present invention includes: a classifier storing section that stores information on a classifier that outputs part likelihood concerning a predetermined part of a detection target when applied to an image; a part likelihood acquiring section that calculates, concerning an image region included in an input image, the part likelihood on the basis of the information on the classifier; a part position determining section that determines, on the basis of the calculated part likelihood, a position of the predetermined part in the input image; a reference position information storing section that stores information on a reference position of the predetermined part; a difference acquiring section that calculates, on the basis of the information on the reference position, difference information between the reference position of the predetermined part and the determined position of the predetermined part; and a reliability acquiring section that calculates, on the basis of the difference information, reliability indicating possibility that the input image is an image of the detection target.

In a reliability acquiring method according to an aspect of the present invention, a computer calculates, concerning an image region included in the an input image and by referring to a classifier storing section that stores information on a classifier that outputs part likelihood concerning a predetermined part of a detection target when applied to an image, the part likelihood on the basis of the information on the classifier, determines a position of the predetermined part in the input image on the basis of the calculated part likelihood, calculates, by referring to a reference position information storing section that stores information on a reference position of the predetermined part and on the basis of the information on the reference position, difference information between the reference position of the predetermined part and the determined position of the predetermined part, and calculates possibility that the input image is an image of the detection target on the basis of the difference information.

A program according to an aspect of the present invention is a program for causing a computer to realize: a function of calculating, concerning an image region included in the an input image and by referring to a classifier storing section that stores information on a classifier that outputs part likelihood concerning a predetermined part of a detection target when applied to an image, the part likelihood on the basis of the information on the classifier; a function of determining a position of the predetermined part in the input image on the basis of the calculated part likelihood; a function of calculating, by referring to a reference position information storing section that stores information on a reference position of the predetermined part and on the basis of the information on the reference position, difference information between the reference position of the predetermined part and the determined position of the predetermined part; and a function of calculating possibility that the input image is an image of the detection target on the basis of the difference information.

Note that, in the present invention, "section" does not simply means physical means and also includes realization of a function of the "section" by software. A function of one "section" or device may be realized by two or more physical means or devices. Functions of two or more "sections" or devices may be realized by one physical means or device.

According to the present invention, it is possible to calculate, at high accuracy, reliability for determining whether an input image is an image of a detection target.

DETAILED DESCRIPTION

An embodiment of the present invention is explained below with reference to the drawings in an example in which a detection target is a face and feature point likelihood (facial feature point reliability) of feature points (facial feature points) corresponding to parts of the face such as the eyes and the nose is used as part likelihood concerning the parts of the face.

Figure 1:
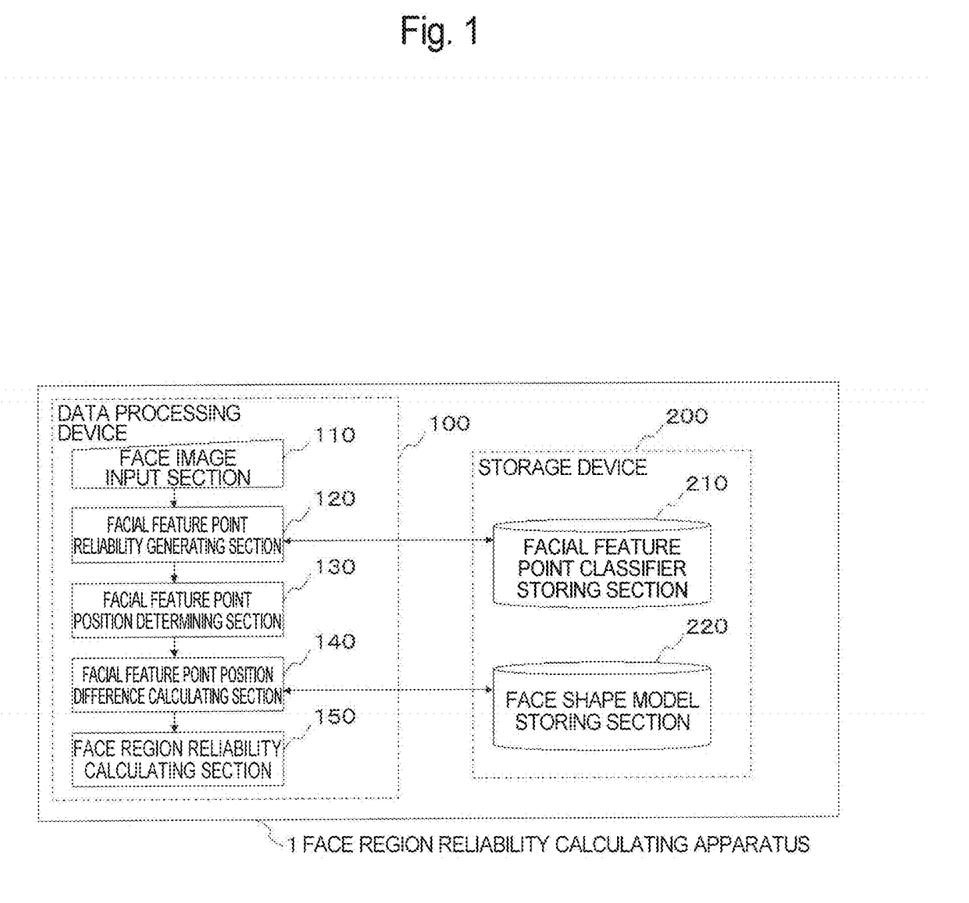
FIG. 1 is a diagram showing a configuration example of a face region reliability calculating apparatus 1 in an embodiment.

FIG. 1 is a diagram showing a configuration example of a face region reliability calculating apparatus 1 in an embodiment of the present invention. As shown in FIG. 1, the face region reliability calculating apparatus 1 according to the present invention includes a data processing device 100 and a storage device 200. The data processing device 100 includes a face image input section 110, a facial feature point reliability generating section 120, a facial feature point position determining section 130, a facial feature point position difference calculating section 140, and a face region reliability calculating section 150. The storage device 200 includes a facial feature point classifier storing section 210 and a face shape model storing section 220. Note that, although not shown in the figure, the face region reliability calculating apparatus 1 may include a conventional face detector.

The facial feature point classifier storing section 210 stores, for each of facial feature points, information on a facial feature point classifier that outputs feature point likelihood when applied to an image. The facial feature point classifier can be generated using various conventional techniques.

The face shape model storing section 220 stores, as information on a reference position of parts of a face, information on a face shape model for specifying reference positions of facial feature points on the basis of statistical distribution concerning positions (coordinates) of the facial feature points. As the face shape model, it is possible to assume, for example, a model for specifying, for each of the facial feature points, as reference positions, average coordinates of facial feature points of a plurality of people, a model for specifying, assuming a vector X having position coordinates of the facial feature points as elements, a subspace obtained by subjecting vectors X obtained from a plurality of face images to principal component analysis, a model for specifying the reference positions of the facial feature points using a parametrix function, and a model for retaining average positions (positions in an image coordinate system) of the facial feature points in an environment in which the size of an input image and a photographing position of the face are fixed.

The face image input section 110 acquires an input image set as a processing target.

The facial feature point reliability generating section 120 calculates, concerning an image region (including pixels) included in the input image, facial feature point likelihood on the basis of the information on the facial feature point classifier stored in the facial feature point classifier storing section 210 and generates a reliability image representing a distribution of the facial feature point likelihood.

The facial feature point position determining section 130 determines, on the basis of the reliability image generated by the facial feature point reliability generating section 120, positions of facial feature points (detected feature points) in the input image.

The facial feature point position difference calculating section 140 calculates reference positions of the facial feature points on the basis of the face shape model stored in the face shape model storing section 220 and calculates difference information between the reference positions of the facial feature points and the positions of the detected feature points determined by the facial feature point position determining section 130.

The face region reliability calculating section 150 calculates, on the basis of the difference information calculated by the facial feature point position difference calculating section 140, face region reliability indicating possibility that the input image is a face image.

Figure 2:
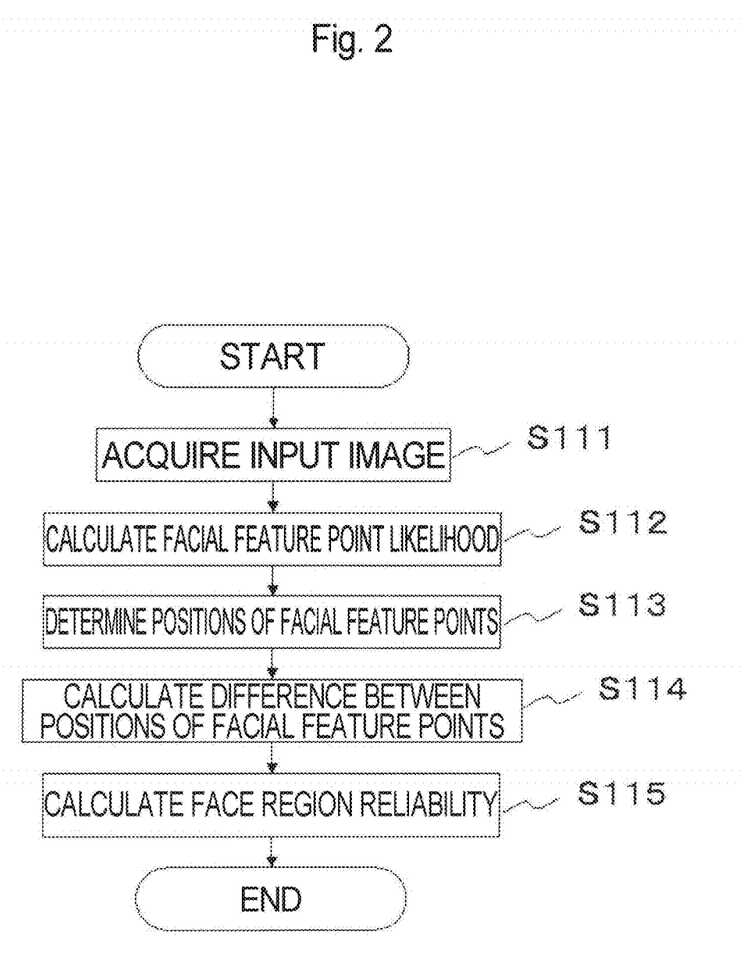
FIG. 2 is a flowchart for explaining the operation of the face region reliability calculating apparatus 1 in the embodiment.

The operation of the face region reliability calculating apparatus 1 is explained with reference to the drawings. FIG. 2 is a flowchart for explaining the operation of the face region reliability calculating apparatus 1 shown in FIG. 1.

First, the face image input section 110 acquires an input image set as a processing target (step S111).

Subsequently, the facial feature point reliability generating section 120 calculates, concerning an image region included in the input image, facial feature point likelihood on the basis of the information on the facial feature point classifier stored in the facial feature point classifier storing section 210 and generates a reliability image representing a distribution of the facial feature point likelihood (step S112).

Subsequently, the facial feature point position determining section 130 determines, on the basis of the reliability image generated in S112, positions of facial feature points (detected feature points) in the input image (step S113).

Subsequently, the facial feature point position difference calculating section 140 calculates reference positions of the facial feature points on the basis of the face shape model stored in the face shape model storing section 220 and calculates difference information between the reference positions of the facial feature points and the positions of the detected feature points determined in S113 (step S114).

Subsequently, the face region reliability calculating section 150 calculates, on the basis of the difference information calculated in S114, face region reliability indicating possibility that the input image is a face image (step S115).

According to this embodiment, the face region reliability calculating section calculates face region reliability on the basis of whether positions of facial feature points of parts such as the eyes, the nose, and the mouth are arranged to be like a face. Therefore, it is possible to calculate face region reliability at higher practical accuracy. By using such face region reliability, even when face detector detects a region, which is not the face, such as a background as a face region by mistake, it is possible to accurately determine whether the detected face region is truly the face.

The configuration and the operation in the embodiment of the present invention are explained with reference to a specific example.

In the face region reliability calculating apparatus 1 according to the present invention shown in FIG. 1, the data processing device 100 can be configured using an information processing apparatus such as a personal computer or a portable information terminal. The storage device 200 (the facial feature point classifier storing section 210 and the face shape model storing section 220) can be configured by, for example, a semiconductor memory or a hard disk.

The face image input section 110, the facial feature point reliability generating section 120, the facial feature point position determining section 130, the facial feature point position difference calculating section 140, and the face region reliability calculating section 150 can be realized by, in the data processing device 100, for example, a CPU (central processing unit) executing a program stored in a storing section. Note that a part or all of the sections of the data processing device 100 may be realized as hardware. For example, the face image input section 110 may include an imaging section such as a digital camera or a scanner and may include a communication module or the like for communicating with an external device and acquiring an input image.

The face image input section 110 acquires an input image for which face region reliability is calculated. The input image to be acquired may be a face region image detected by a conventional face detector or may be an image obtained by imaging a person using a digital camera or the like.

Figure 3:
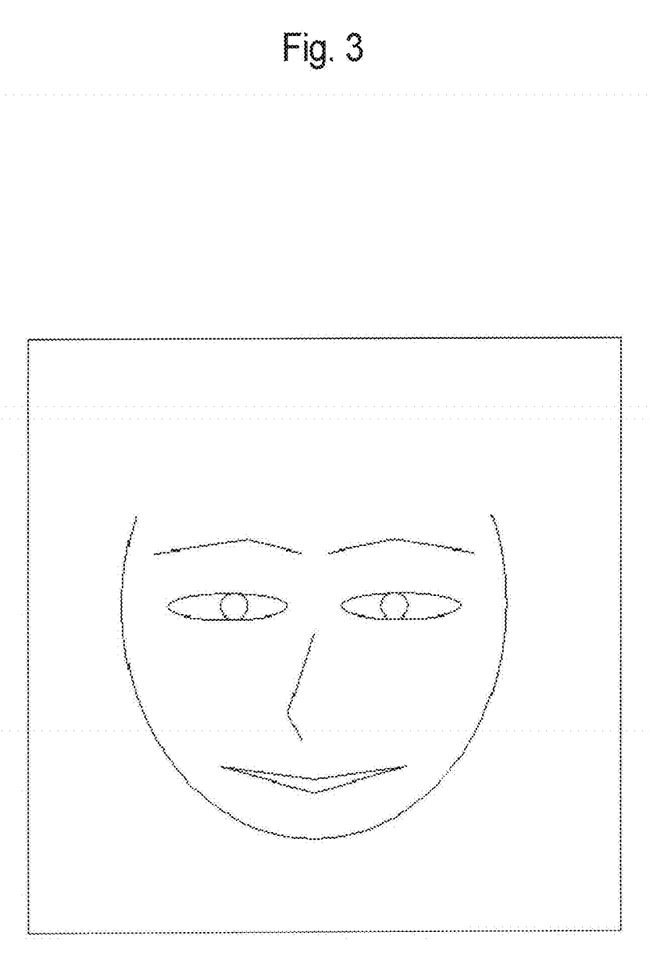
FIG. 3 is a diagram showing an example of an image input by an image input section.

FIG. 3 is a diagram showing an example of the input image. The input image may include a background other than a face. When the face region reliability calculating apparatus 1 includes a face detector, the face region reliability calculating apparatus 1 can apply face detection processing to the image imaged by the digital camera or the like, crop a face region image, and use the face region image as the input image.

The facial feature point reliability generating section 120 applies the facial feature point classifier, which is stored in the facial feature point classifier storing section 210, to the input image acquired by the face image input section 110 and calculates, for example, concerning pixels of the input image, feature point likelihood corresponding to parts of the face such as the eyes and the nose.

Figure 4:
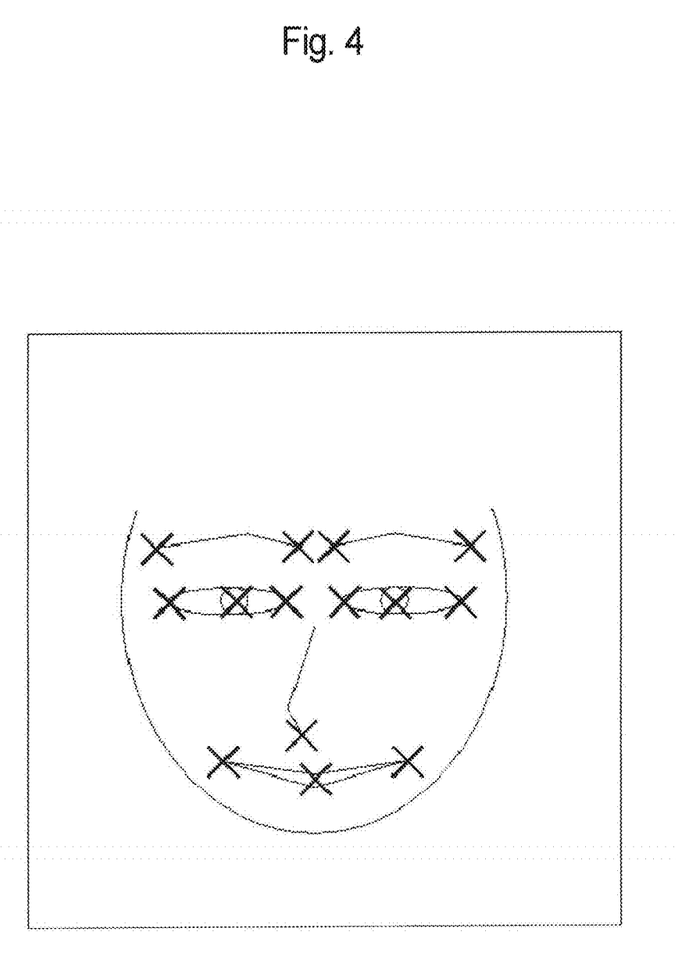
FIG. 4 is a diagram showing facial feature points targeted by a facial feature point reliability generating apparatus in an image showing a face.

FIG. 4 is a diagram showing an example of the facial feature points. In FIG. 4, the facial feature points are indicated by X marks. In this example, as shown in FIG. 4, fourteen points, i.e., both the ends of the left and right eyebrows, the centers and both the ends of the left and right eyes, a lower part of the nose, and both the ends and the center of the mouth are used as the facial feature points. Note that the facial feature points are not limited to the example shown in FIG. 4. Besides the fourteen points, the facial feature points may be one point.

The facial feature point reliability generating section 120 generates, for each of the facial feature points, a reliability image indicating facial feature point likelihood as a pixel value. In the example shown in FIG. 4, fourteen reliability images are generated. Note that, as a method of applying the facial feature point classifier to calculate the facial feature point likelihood, conventionally proposed various methods can be used. For example, as described in Patent Literature 2, a classifier for each of facial feature points configured using AdaBoost based on Haar-like features by Viola and Jones is applied to an entire region of an input image to generate a reliability image. In this way, in learning of the facial feature point classifier, by using image feature values and a learning algorithm robust against illumination and facial expression fluctuation, it is possible to calculate face region reliability robust against illumination and facial expression fluctuation.

Figure 5:
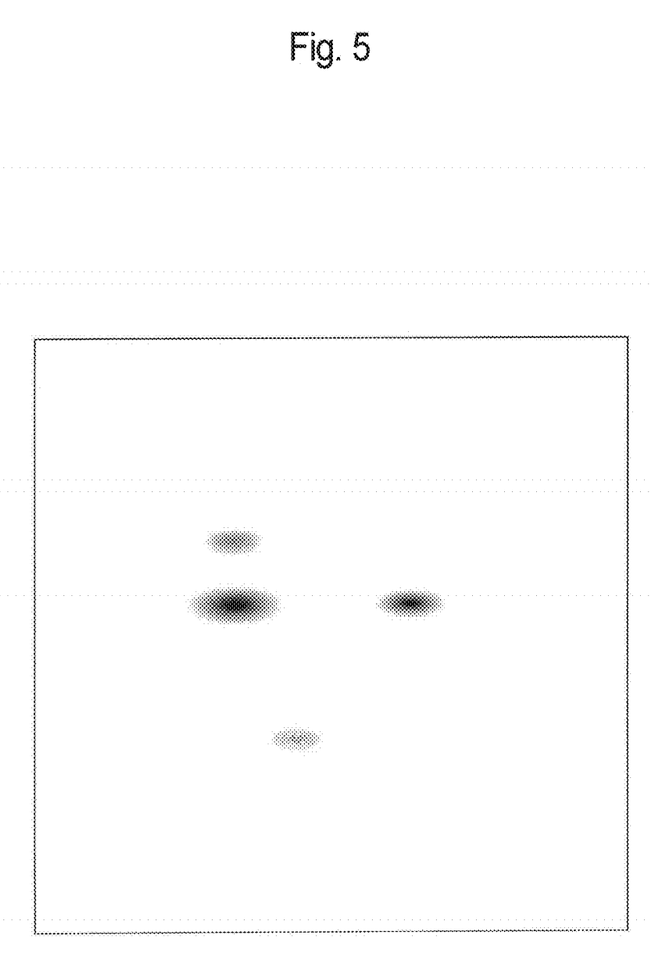
FIG. 5 is a diagram showing an example of a reliability image of the pupil center of the right eye.

FIG. 5 is a diagram showing an example of a reliability image corresponding to the right eye center. In the example shown in FIG. 5, as facial feature point likelihood is larger, the reliability image is shown as denser black. It is indicated that, besides the right eye center, the facial feature likelihood in the right eye center is large (likely to be the right eye center) near the pupil center of the left eye, near the right eyebrow, and near the nose bottom.

The facial feature point position determining section 130 determines, on the basis of the reliability images generated by the facial feature point reliability generating section 120, positions of the facial feature points in the input image. The facial feature point position determining section 130 can determine, as the corresponding positions of the facial feature points, positions where facial feature value likelihood is maximized in the reliability images generated by the facial feature point reliability generating section 120. Alternatively, instead of the positions where the facial feature point likelihood is maximized in the reliability images, the facial feature point position determining section 130 may determine, as the positions of the facial feature points, positions where a product of a prior distribution of facial feature point positions and the facial feature point likelihood is maximized.

Figure 6:
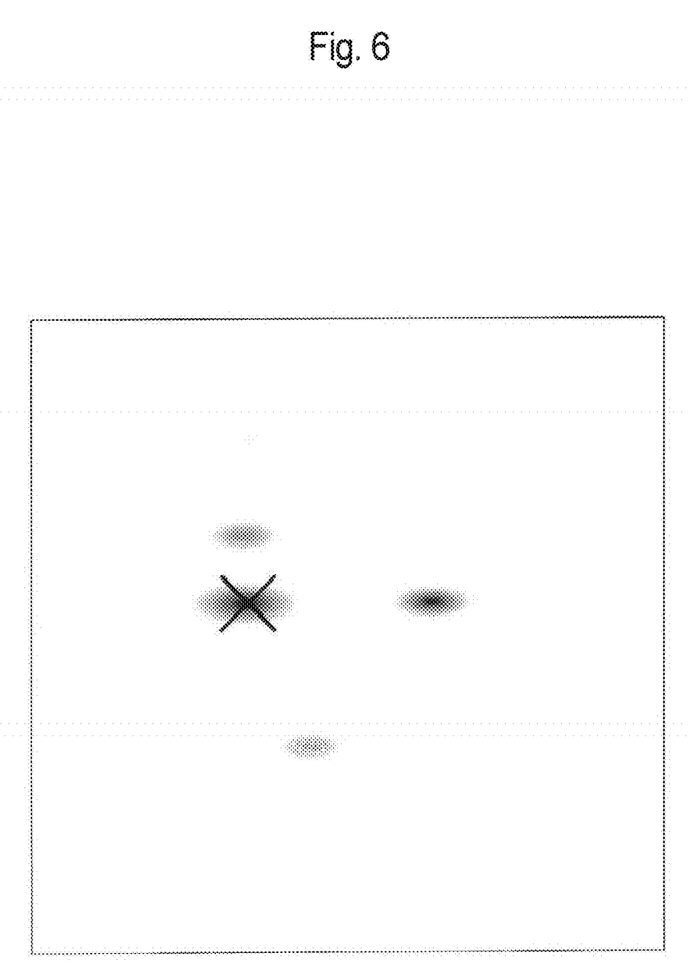
FIG. 6 is a diagram showing a position where reliability is maximized in a reliability image of the periphery of the pupil center of the right eye.

FIG. 6 is a diagram in which a position where the facial feature point likelihood is maximized is indicated by an X mark in the reliability image corresponding to the right eye center.

The facial feature point position difference calculating section 140 calculates, on the basis of the face shape model stored in the face shape model storing section 220, positions of reference positions (face shape model feature points) of the facial feature points determined on the basis of the face shape model and calculates, for each of the facial feature points, difference information between the reference positions of the facial feature points and the facial feature points (detected feature points) in the input image determined by the facial feature point position determining section 130.

The calculation of the difference information of the facial feature point positions is performed, for example, as explained below. Note that, in the following explanation, it is assumed that the reference positions of the facial feature points are directly recorded in the face shape model storing section 220 as the face shape model. Specifically, in this example, as the face shape model, two-dimensional coordinate values (twenty-eight values) are respectively recorded concerning the fourteen facial feature points shown in FIG. 4. Similarly, the positions of the detected feature points determined by the facial feature point position determining section 130 are two-dimensional coordinate values (twenty-eight values) concerning the fourteen facial feature points shown in FIG. 4.

There is a difference between a coordinate system of the face shape model feature points and a coordinate system of the detected feature points. Therefore, to calculate a difference in positions among these feature points, both the coordinate systems need to be aligned. Therefore, first, coordinate transformation p from a coordinate t of the detected feature point to a coordinate k of the face shape model feature point is calculated.

In this example, as the coordinate transformation p, Helmert transformation, which is coordinate transformation concerning an x-axis direction, a y-axis direction, rotation in an in-screen direction, and a scale, is used. In this case, the coordinate transformation p is specified by four parameters (pa, pb, pc, and pd) for specifying the Helmert transformation indicated by Expression (1). In Expression (1), t indicates a coordinate before the transformation and u indicates a coordinate after the transformation.

[Math 1]

$$\begin{pmatrix} u_x \\ u_y \end{pmatrix} = \begin{pmatrix} p_a & p_b \\ -p_b & p_a \end{pmatrix} \begin{pmatrix} t_x \\ t_y \end{pmatrix} + \begin{pmatrix} p_c \\ p_d \end{pmatrix} \quad (1)$$

In this example, a parameter of the Helmert transformation p is calculated by a least square method. In this case, p that minimizes a square error (Expression (2)) from a face shape model feature point when the detected feature point t is transformed by certain coordinate transformation p is a parameter of the Helmert transformation that should be calculated. Note that N in Expression (2) represents the number of facial feature points. When square errors are calculated concerning the fourteen facial feature points shown in FIG. 4, N=14.

[Math 2]

$$\sum_{i=1}^{N} \|p(t_i) - k_i\|^2 \quad (2)$$

The coordinate transformation p for minimizing the square error represented by Expression (2) can be analytically calculated according to Expression (3). Note that n in Expression (3) is the number of data in calculating a least square and [z] is an average of z.

[Math 3]

$$p_a = \frac{[t_x][u_x] + [t_y][u_y] - n[t_x u_x + t_y u_y]}{[t_x]^2 + [t_y]^2 - n[t_x^2 + t_y^2]} \quad (3)$$

$$p_b = \frac{[t_y][u_x] - [t_x][u_y] - n[t_y u_x - t_x u_y]}{[t_x]^2 + [t_y]^2 - n[t_x^2 + t_y^2]}$$

$$p_c = \frac{1}{n}\{[u_x] - p_a[t_x] - b[t_y]\}$$

$$p_d = \frac{1}{n}\{[u_y] - p_a[t_y] - b[t_x]\}$$

Subsequently, a Euclidian distance between the coordinate k of the face shape model feature point and the coordinate t of the detected feature point is calculated for each of the facial feature points as a difference $\epsilon$ according to Expression (4), using the calculated coordinate transformation p.

[Math 4]

$$\epsilon_i = \|p(t_i) - k_i\| \quad (4)$$

Note that, in calculating the difference $\epsilon$ between the coordinate k of the face shape model feature point and the coordinate t of the detected feature point, the facial feature point position difference calculating section 140 may use another distance scale such as a Mahalanobis distance rather than the Euclidian distance between the coordinate k of the face shape model feature point and the coordinate t of the detected feature point.

Further, when the facial feature point position determining section 130 fails in determining a position of a facial feature point (e.g., when a wrong position is determined as a facial feature point in a situation in which a facial feature point is blocked by sunglasses or a mask or a situation in which an input image is unclear and it is difficult to specify a position of a facial feature point), the facial feature point position difference calculating section 140 may treat the facial feature point as an outlier and process the facial feature point. Specifically, a method of not using, in calculating the coordinate transformation p from the detected feature point t to the face shape model feature point k, a facial feature point where facial feature point likelihood of a position determined by the facial feature point position determining section 130 is equal to or smaller than a predetermined threshold is conceivable. To calculate a difference of a position of a facial feature point taking into account a facial feature point, a position of which determined by the facial feature point position determining section 130 greatly deviates from a true position (e.g., when a facial feature point of the right eye is determined as being present in a position near the left eye), the coordinate transformation p from the coordinate k of the face shape model feature point to the coordinate t of the detected feature point can be calculated by a method of robust estimation. As the robust estimation, conventionally proposed various methods can be used.

As an example of a method of calculating the coordinate transformation p using the robust estimation in the facial feature point position difference calculating section 140, a method of calculating Helmert transformation p from the coordinate t of the detected feature point to the coordinate k of the face shape model feature point using a least median of squares (LMedS) method is explained.

First, two facial feature points are selected at random from the fourteen facial feature points shown in FIG. 4. In the following explanation, the facial feature points selected at random are indicated by signs "a" and "b". Among the detected feature points, a set of coordinates corresponding to the two facial feature points selected at random is represented as (ta, tb). Among the face shape model feature points, a set of coordinates corresponding to the two facial feature points selected at random is represented as (ka, kb). Note that ka, kb, ta, and tb are respectively two-dimensional vectors representing coordinate values.

Subsequently, a parameter of the Helmert transformation p from the set of coordinates (ta, tb) to the set of coordinates (ka, kb) is calculated. In this case, since the transformation is from two points to two points, the parameter is uniquely calculated.

Subsequently, the fourteen points of the coordinate t of the detected feature points are subjected to coordinate transformation according to the calculated Helmert transformation p. A converted coordinate is represented as u. Subsequently, a Euclidian distance between the coordinate u and the coordinate k is calculated for each of the fourteen facial feature points. A median of the distances for the fourteen points is retained.

The above processing is repeated. The Helmert transformation p having the smallest Euclidian distance is finally adopted.

The face region reliability calculating section 150 calculates, on the basis of the difference information of the position for each of the facial feature points calculated by the facial feature point position difference calculating section 140, face region reliability J indicating possibility that the input image is a face image and stores the face region reliability J in the storing section. The face region reliability J stored in the storing section can be read out by various applications such as face recognition and can be used according to purposes of the applications.

The calculation of the face region reliability J can be performed by calculating, from the difference $\epsilon$ of the position of the facial feature point calculated by the facial feature point position difference calculating section 140, according to Expression (5), a median of a value obtained by converting the difference $\epsilon$ with a function. The function $\sigma$ is a function, a value of which decreases when a value of the difference $\epsilon$ increases. For example, a sigmoid function indicated by Expression (6) is used. "a" and "b" in Expression (6) are parameters for adjusting a degree of a reduction of the value of the function $\sigma$ when the value of the difference $\epsilon$ increases. "a" is a negative number.

[Math 5]

$$J = med(\sigma(\varepsilon_i)) \qquad (5)$$

[Math 6]

$$\sigma(\varepsilon) = \frac{1}{1 + \exp(-a(\varepsilon - b))} \qquad (6)$$

Note that the face region reliability calculating section 150 may calculate an average of a value obtained by converting the difference $\epsilon$ with the function $\sigma$ as the face region reliability J rather than calculating the median of the value obtained by converting the difference $\epsilon$ of the position of the facial feature point with the function $\sigma$ as the face region reliability J.

In calculating the face region reliability J, the face region reliability calculating section 150 may use the facial feature point likelihood in the position of the detected feature point calculated by the facial feature point position determining section 130 in addition to the difference $\epsilon$ of the position of each of the facial feature point calculated by the facial feature point position difference calculating section 140.

In this case, the calculation of the face region reliability J can be performed by calculating, when the difference of the position of each of the facial feature points is represented as $\epsilon$ and facial feature point likelihood of each of the facial feature points is represented as s, a weighted sum of a median (or an average) of a value obtained by converting the difference $\epsilon$ with the function $\sigma$ and a median (an average) of the facial feature likelihood s according to Expression (7). In Expression (7), c is a parameter for adjusting a balance of the difference $\epsilon$ of the facial feature point position and the facial feature point likelihood s. Note that c is a real number value in a range of 0 to 1.

[Math 7]

$$J = c \times med(\sigma(\epsilon_i)) + (1-c) \times med(s_i) \qquad (7)$$

In calculating the face region reliability J, the face region reliability calculating section 150 may calculate integrated face region reliability using one or a plurality of levels of additional face region reliability (e.g., values representing face likelihood output by a conventional face detecting apparatus) calculated by a method different from a method for calculating the face region reliability J, in addition to the difference $\epsilon$ of position of each of the facial feature points calculated by the facial feature point position difference calculating section 140 (or, in addition to that, the facial feature point likelihood s in the facial feature point position calculated by the facial feature point position determining section 130).

For example, the face region reliability calculating section 150 may calculate integrated face region reliability Ĵ that according to Expression (8) from the face region reliability J calculated according to Expression (5) from the difference ϵ of the position of each of the facial feature points (or the face region reliability J calculated according to Expression (7) from the difference ϵ and the facial feature point likelihood s of each of the facial feature points). In Expression. (8), d is a parameter for adjusting a balance of the face region reliability J and an additional face region reliability J0. Note that d is a real number value in a range of 0 to 1.

[Math 8]

$$\hat{J} = d \times J + (1-d) \times J_0 \quad (8)$$

With the configuration in this example, the face region reliability acquiring section calculates face region reliability on the basis of whether positions of predetermined parts detected in an input image (in this example, positions of facial feature points corresponding to the eyes, the nose, the mouth, and the like) are arranged like predetermined parts of a detection target or, in addition to that, on the basis of part likelihood in detected positions (in this example, the facial feature point likelihood s) rather than calculating reliability according to whether the input image as a whole includes a texture like a part of a detection target (in this example, the face). Therefore, it is possible to calculate face region reliability at higher practical accuracy. By using the face region reliability, even when the face detector detects a region that is not the face such as a background as a face region, it is possible to accurately determine whether the detected region is truly the face.

The face region reliability calculating apparatus, the face region reliability calculating method, and the face region reliability calculating program according to this embodiment can be widely used for improvement of accuracy in processing for receiving face images in face detection, face authentication, facial expression recognition, and the like as inputs.

Note that this embodiment is intended to facilitate understanding of the present invention and is not intended to limitedly interpret the present invention. The present invention can be changed and improved without departing from the spirit of the present invention. Equivalents of the present invention are also included in the present invention.

For example, in the example explained in the embodiment, the face region reliability calculating apparatus calculates facial feature point likelihood as part likelihood. However, the present invention is not limited to such a configuration. For example, a part other than the face can be a detection target. As the part likelihood, region likelihood and the like can be used rather than the feature point likelihood. That is, a classifier that outputs part likelihood of the detection target can be generated. When a reference position of a part can be statistically determined (a model can be generated), the present invention can be applied to the detection target and the part to calculate reliability.

The present invention is explained above with reference to the embodiment. However, the present invention is not limited to the embodiment. Various changes that those skilled in the art can carry out within the scope of the present invention can be made to the configuration and the details of the present invention.

A part or all of the embodiment can be described as indicated by the following notes but is not limited to the following.

(Note 1) A reliability acquiring apparatus including: a classifier storing section that stores information on a classifier that outputs part likelihood concerning a predetermined part of a detection target when applied to an image; a part likelihood acquiring section that calculates, concerning an image region included in an input image, the part likelihood on the basis of the information on the classifier; a part position determining section that determines, on the basis of the calculated part likelihood, a position of the predetermined part in the input image; a reference position information storing section that stores information on a reference position of the predetermined part; a difference acquiring section that calculates, on the basis of the information on the reference position, difference information between the reference position of the predetermined part and the determined position of the predetermined part; and a reliability acquiring section that calculates, on the basis of the difference information, reliability indicating possibility that the input image is an image of the detection target.

(Note 2) The reliability acquiring apparatus recited in note 1, wherein the detection target is a face.

(Note 3) The reliability acquiring apparatus recited in note 1 or 2, wherein the classifier storing section and the reference position information storing section respectively store, concerning a plurality of predetermined parts, information on the classifier and information on reference positions, and the part likelihood acquiring section, the part position determining section, and the difference acquiring section respectively, concerning the predetermined parts, acquire the part likelihood, determine positions of the predetermined parts, and calculate the difference information.

(Note 4) The reliability acquiring apparatus recited in any one of notes 1 to 3, wherein the reliability acquiring section calculates the reliability on the basis of the difference information and the calculated part likelihood.

(Note 5) The reliability acquiring apparatus recited in any one of notes 1 to 4, wherein the reliability acquiring section calculates integrated reliability on the basis of the reliability and one or more levels of additional reliability calculated by a method different from a method for calculating the reliability.

(Note 6) The reliability acquiring apparatus recited in any one of notes 1 to 5, wherein the difference acquiring section calculates the difference information on the basis of whether the part position determined by the position determining section is an outlier using a method of robust estimation.

(Note 7) A reliability acquiring method in which a computer calculates, concerning an image region included in the an input image and by referring to a classifier storing section that stores information on a classifier that outputs part likelihood concerning a predetermined part of a detection target when applied to an image, the part likelihood on the basis of the information on the classifier, determines a position of the predetermined part in the input image on the basis of the calculated part likelihood, calculates, by referring to a reference position information storing section that stores information on a reference position of the predetermined part and on the basis of the information on the reference position, difference information between the reference position of the predetermined part and the determined position of the predetermined part, and calculates possibility that the input image is an image of the detection target on the basis of the difference information.

(Note 8) A program for causing a computer to realize: a function of calculating, concerning an image region included in the an input image and by referring to a classifier storing section that stores information on a classifier that outputs part likelihood concerning a predetermined part of a detection target when applied to an image, the part likelihood on the basis of the information on the classifier; a function of determining a position of the predetermined part in the input image on the basis of the calculated part likelihood; a function of calculating, by referring to a reference position information storing section that stores information on a reference position of the predetermined part and on the basis of the information on the reference position, difference information between the reference position of the predetermined part and the determined position of the predetermined part; and a function of calculating possibility that the input image is an image of the detection target on the basis of the difference information.

This application claims priority based on Japanese Patent Application No. 2012-31319 filed on Feb. 16, 2012, the entire disclosure of which is incorporated herein.

1 Face region reliability calculating apparatus
100 Data processing device
110 Face image input section
120 Facial feature point reliability generating section
130 Facial feature point position determining section
140 Facial feature point position difference calculating section
150 Face region reliability calculating section
200 Storage device
210 Facial feature point classifier storing section
220 Face shape model storing section

I claim:

1. A reliability calculating apparatus for detection of a target as a face, comprising:
a processor; and
a storing device,
wherein the storing device comprises:
classifier storage that stores information on a classifier that outputs a part likelihood of a predetermined part of a detection target which is calculated based on image feature values concerning the predetermined part of the detection target, and
reference position storage that stores information on a reference position of the predetermined part,
wherein the storing device further has, stored therein, programming code that, upon execution by the processor, causes the processor to perform the functions of:
retrieving, from the classifier storing device, information on the classifier from the classifier storage,
calculating, using data of an image region included in an input image, a part likelihood of the input image by using the retrieved information on the classifier,
determining, based on the calculated part likelihood, a position of the predetermined part in the input image,
retrieving information on the reference position of the predetermined part of the detection target stored from the reference position information storing,
calculating difference information between the reference position of the predetermined part of the detection target and the determined position of the predetermined part, and
calculating first reliability indicating possibility that the input image is an image showing the detection target based on a facial feature point likelihood calculated based on the image feature values,
wherein the image feature values include a difference in intensity values,
wherein the programming code causes the processor, in calculating difference information between the reference position of the predetermined part of the detection target and the determined position of the predetermined part, to calculate the difference information on the basis of whether the position of the predetermined part in the input image determined by the position determining unit is an outlier using a method of robust estimation,
and wherein the detection target is a face.

2. The reliability calculating apparatus according to claim 1,
wherein the programming code further causes the processor to calculate a third reliability based on the first reliability and one or more second reliabilities, and
wherein each of the second reliabilities indicates a possibility that the input image is the image of the detection target, and is calculated in a manner different from that of calculating the first reliability.

3. The reliability calculating apparatus according to claim 1, wherein
the classifier storage and the reference position information storage respectively store information on part likelihood and information on reference positions for a plurality of predetermined parts, and
the part likelihood acquiring unit, the part position determining unit, and the difference acquiring unit, respectively concerning the plurality of predetermined parts, acquire the part likelihood, determine positions of the predetermined parts, and calculate the difference information.

4. The reliability calculating apparatus according to claim 3, wherein the programming code, in calculating the first reliability, causes the processor to calculate the reliability on the basis of the difference information and the calculated part likelihood.

5. The reliability calculating apparatus according to claim 4,
wherein the programming code further causes the processor to calculate a third reliability based on the first reliability and one or more second reliabilities, and
wherein each of the second reliabilities indicates a possibility that the input image is the image of the detection target, and is calculated in a manner different from that of calculating the first reliability.

6. The reliability calculating apparatus according to claim 3,
wherein the programming code further causes the processor to calculate a third reliability based on the first reliability and one or more second reliabilities, and
wherein each of the second reliabilities indicates a possibility that the input image is the image of the detection target, and is calculated in a manner different from that of calculating the first reliability.

7. The reliability calculating apparatus according to claim 1, wherein the programming code, in calculating the first reliability, causes the processor to calculate the reliability on the basis of the difference information and the calculated part likelihood.

8. The reliability calculating apparatus according to claim 7,
wherein the programming code further causes the processor to calculate a third reliability based on the first reliability and one or more second reliabilities, and wherein each of the second reliabilities indicates a possibility that the input image is the image of the detection target, and is calculated in a manner different from that of calculating the first reliability.

9. The reliability calculating apparatus according to claim 1,
wherein the programming code further causes the processor to calculate a third reliability based on the first reliability and one or more second reliabilities, and
wherein each of the second reliabilities indicates a possibility that the input image is the image of the detection target, and is calculated in a manner different from that of calculating the first reliability.

10. A reliability calculating method for detection of a target as a face performed by a computer, comprising the computer-performed steps of:
retrieving, from a classifier storing device, information on a classifier which outputs a part likelihood of a predetermined part of a detection target calculated based on image feature values concerning the predetermined part of the detection target;
calculating, using data of an image region included in an input image, a part likelihood of the input image by using the retrieved information on the classifier;
determining a position, in the input image, of the predetermined part of the detection target based on the calculated part likelihood;
retrieving information on a reference position of the predetermined part of the detection target stored in a reference position information storing device;
calculating difference information between the reference position of the predetermined part of the detection target and the determined position of the predetermined part; and
calculating a first reliability that indicates a possibility that the input image is an image showing the detection target based on a facial feature point likelihood calculated based on the image feature values,
wherein the image feature values include a difference in intensity values,
wherein, in calculating the difference information between the reference position of the predetermined part of the detection target and the determined position of the predetermined part, the difference information is calculated on the basis of whether the position of the predetermined part in the input image determined by the position determining unit is an outlier using a method of robust estimation,
and wherein the detection target is a face.

11. A program for detection of a target as a face comprising computer-readable software code stored on a non-transitory recording medium that, upon execution by a processor device of a computer, causes, the computer to perform steps of:
retrieving, from a classifier storing device, information on a classifier which outputs a part likelihood of a predetermined part of a detection target calculated based on image feature values concerning the predetermined part of the detection target;
calculating, using data of an image region included in an input image, a part likelihood of the input image by using the retrieved information on the classifier;
determining a position of the predetermined part in the input image based on the calculated part likelihood;
retrieving information on a reference position of the predetermined part of the detection target stored in a reference position information storing device;
calculating difference information between the reference position of the predetermined part of the detection target and the determined position of the predetermined part; and
calculating first reliability that indicates a possibility that the input image is an image showing the detection target based on a facial feature point likelihood calculated based on the image feature values,
wherein the image feature values include a difference in intensity values,
wherein, in calculating the difference information between the reference position of the predetermined part of the detection target and the determined position of the predetermined part, the difference information is calculated on the basis of whether the position of the predetermined part in the input image determined by the position determining unit is an outlier using a method of robust estimation,
and wherein the detection target is a face.

* * * * *